United States Patent
Izutsu et al.

(10) Patent No.: US 8,282,146 B2
(45) Date of Patent: Oct. 9, 2012

(54) AUTOMOTIVE REAR VEHICLE BODY STRUCTURE

(75) Inventors: Masaki Izutsu, Wako (JP); Kanji Fujii, Wako (JP); Yutaka Kobashi, Wako (JP); Hidenori Matsumoto, Wako (JP); Katsuya Hishiki, Wako (JP); Masami Yaguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 268 days.

(21) Appl. No.: 12/673,687

(22) PCT Filed: May 14, 2008

(86) PCT No.: PCT/JP2008/001205
§ 371 (c)(1),
(2), (4) Date: Feb. 16, 2010

(87) PCT Pub. No.: WO2009/025064
PCT Pub. Date: Feb. 26, 2009

(65) Prior Publication Data
US 2011/0215617 A1    Sep. 8, 2011

(30) Foreign Application Priority Data

Aug. 21, 2007 (JP) .................. 2007-214430
Mar. 17, 2008 (JP) .................. 2008-068075

(51) Int. Cl.
*B62D 21/02* (2006.01)
(52) U.S. Cl. .............. 296/37.2; 296/187.11; 296/193.08; 296/203.04
(58) Field of Classification Search ............. 296/187.11, 296/193.08, 203.04, 204, 37.2
See application file for complete search history.

(56) References Cited

U.S. PATENT DOCUMENTS

| | | | | |
|---|---|---|---|---|
| 4,950,031 A | * | 8/1990 | Mizunaga et al. | 296/187.11 |
| 5,110,177 A | * | 5/1992 | Akio | 296/187.11 |
| 5,114,184 A | * | 5/1992 | Shimomura et al. | 280/784 |
| 5,174,628 A | * | 12/1992 | Hayatsugu et al. | 296/187.11 |

(Continued)

FOREIGN PATENT DOCUMENTS

FR    1448214    8/1966

(Continued)

*Primary Examiner* — Glenn Dayoan
*Assistant Examiner* — Gregory Blankenship
(74) *Attorney, Agent, or Firm* — Rankin, Hill & Clark LLP

(57) ABSTRACT

Provided is an automotive rear vehicle body structure which increases the amount of energy that can be absorbed, improves the safety of the vehicle occupant and protects a fuel tank in a reliable manner at the time of a rear end collision while allowing a spare tire to be placed within a cabin. In an automotive rear vehicle body structure having a H-type torsion beam wheel suspension system (12) pivotally supported by side sill extensions (2a, 3a) on either side of the vehicle body, the wheel suspension system including a pair of trailing arms (13, 14) and a torsion beam (15) connecting intermediate parts of the trailing arms with each other, a pair of rear side frames (6, 7) extend rearwardly from side sills (2, 3), and a spare tire pan (10) is defined by downwardly bulging a part of a rear floor panel (11) located between the rear side frames (6, 7). A pair of rear center frames (21, 22) extending in a fore-and-aft direction are located behind the torsion beam (15) and attached to the lower surface of a bottom wall (10a) of the spare tire pan (10).

18 Claims, 9 Drawing Sheets

U.S. PATENT DOCUMENTS

| | | | | |
|---|---|---|---|---|
| 5,346,275 A * | 9/1994 | Enning et al. | | 296/187.11 |
| 5,364,128 A * | 11/1994 | Ide | | 280/784 |
| 5,419,609 A * | 5/1995 | Kmiec et al. | | 296/187.11 |
| 7,032,961 B2 * | 4/2006 | Matsuda | | 296/204 |
| 7,427,098 B2 * | 9/2008 | Kobayashi et al. | | 296/203.04 |
| 7,540,559 B2 * | 6/2009 | Egawa et al. | | 296/203.04 |
| 7,552,963 B2 * | 6/2009 | Yamaguchi et al. | | 296/187.08 |
| 7,635,158 B2 * | 12/2009 | Park | | 296/203.04 |
| 7,677,651 B2 * | 3/2010 | Yamaguchi et al. | | 296/203.04 |
| 7,784,858 B2 * | 8/2010 | Abe et al. | | 296/203.04 |
| 7,815,251 B2 * | 10/2010 | Kim | | 296/204 |
| 7,905,541 B2 * | 3/2011 | Yamaguchi et al. | | 296/203.04 |
| 7,950,724 B2 * | 5/2011 | Yamaguchi et al. | | 296/187.11 |
| 8,091,941 B2 * | 1/2012 | Asou et al. | | 296/37.2 |
| 2005/0077756 A1 | 4/2005 | Matsuda | | |
| 2006/0061142 A1 * | 3/2006 | Kobayashi et al. | | 296/203.04 |
| 2006/0214414 A1 * | 9/2006 | Wehner et al. | | 280/784 |
| 2008/0252104 A1 * | 10/2008 | Yamaguchi et al. | | 296/203.04 |
| 2009/0001767 A1 * | 1/2009 | Yamaguchi et al. | | 296/203.04 |
| 2009/0195032 A1 * | 8/2009 | Yamaguchi et al. | | 296/203.04 |
| 2010/0052368 A1 * | 3/2010 | Yamaguchi et al. | | 296/203.04 |
| 2011/0101736 A1 * | 5/2011 | Sogame | | 296/203.04 |
| 2011/0121613 A1 * | 5/2011 | Souma et al. | | 296/203.04 |
| 2011/0175401 A1 * | 7/2011 | Fujimura | | 296/203.04 |
| 2011/0215617 A1 * | 9/2011 | Izutsu et al. | | 296/203.04 |
| 2011/0227367 A1 * | 9/2011 | Funakoshi | | 296/187.11 |

FOREIGN PATENT DOCUMENTS

| | | |
|---|---|---|
| JP | 57105874 | 6/1982 |
| JP | 3125682 | 12/1991 |
| JP | 2000255455 | 9/2000 |
| JP | 2002-321642 A | 11/2002 |
| JP | 2002-362426 | 12/2002 |
| JP | 2004-114734 | 4/2004 |
| JP | 2005067432 | 3/2005 |
| JP | 2005-119358 A | 5/2005 |
| WO | 2006114525 | 11/2006 |
| WO | 2008029559 | 3/2008 |

* cited by examiner

AUTOMOTIVE REAR VEHICLE BODY STRUCTURE

TECHNICAL FIELD

The present invention relates to an automotive rear vehicle body structure including a sub frame that is located behind side sills on either side of a vehicle body and supports rear wheels.

BACKGROUND OF THE INVENTION

The torsion beam wheel suspension system including a pair of trailing arms rigidly connected to each other by a torsion beam is known for use as a rear wheel suspension system of front wheel drive vehicles. The torsion beam wheel suspension system has the advantage of providing a favorable ride quality and a stable turning performance in spite of the simple and compact structure thereof. In a vehicle fitted with a torsion beam wheel suspension system, the front end of each trailing arm is pivotally connected to the side sill extension on the corresponding side.

An automobile normally carries a spare tire for the contingency of having a flat tire. A spare tire is typically placed below a rear floor or inside a spare tire pan formed by downwardly bulging a floor panel. Also, most of the currently available vehicles use monocoque vehicle bodies which can be relatively light in weight while ensuring a required rigidity. The floor frame of a monocoque vehicle body is formed by combining stamp formed members made of relatively thin steel sheet. Therefore, to ensure an adequate rigidity to the rear vehicle body structure against a rear end collision while forming a space for receiving a spare tire, the thickness of the steel sheet has to be increased in a corresponding manner or other measures are required to be taken.

However, it is desired that the thickness of the steel sheet be not increased because an increased thickness means an increase in the weight of the vehicle which in turn impairs the fuel economy and reduces the dynamic performance of the vehicle. To the end of improving the absorption of the impact energy at the time of a rear end collision and protecting a fuel tank at the time of a rear end collision in a reliable manner, it has been proposed to join a pair of rear side frames with a middle cross member and a rear end member at front and rear ends of the rear side frames, respectively, and extend a rear center frame having an upwardly slanted upper surface toward the front part thereof across the middle cross member and rear end member on the lower surface of the rear floor panel so that a spare tire may be received in such a manner that the spare tire abuts the lower surface of the rear center frame. See Japanese patent laid open publication No. 2002-362426, for instance. In this arrangement, the spare tire and rear center frame can be used as members for absorbing energy and the spare tire is prevented from moving forward at the time of a rear end collision.

However, according to the invention disclosed in Japanese patent laid open publication No. 2002-362426, the lower surface of the rear center frame is slanted upward toward the front so that the front part of the rear center frame is made prone to buckling. At the time of a rear end collision, once the rear center frame has buckled, the rear center frame is unable to absorb an adequate amount of energy. Also, because the spare tire is placed under the rear center frame or under the rear floor panel, taking out and putting back the tire from and into the designated space when changing the tires cannot be easily performed, and the user may not be able to change tires without soiling his clothing. Furthermore, the spare tire is retained in an exposed state under the rear floor panel so that the spare tire gets soiled very easily, and it could create some difficulty in inspecting the spare tire. Therefore, there is a demand for a vehicle body structure which is relatively safe against a rear end collision and simplifies the inspection of the spare tire and the work involved in changing tires.

BRIEF SUMMARY OF THE INVENTION

In view of such problems of the prior art, a primary object of the present invention is to provide an automotive rear vehicle body structure which increases the amount of energy that can be absorbed, improves the safety of the vehicle occupant and protects a fuel tank in a reliable manner at the time of a rear end collision while allowing a spare tire to be placed within a cabin.

To achieve such an object, the present invention provides an automotive rear vehicle body structure having a sub frame supporting a pair of rear wheels disposed behind a pair of side sills on either side of a vehicle body, comprising: a pair of rear side frames extending rearwardly from the side sills on either side of the vehicle body; a rear floor panel extending between the rear side frames and bulging downward so as to define a spare tire pan; and at least one rear center frame extending in a fore-and-aft direction along a lower wall of the spare tire pan; the rear center frame being disposed behind a sub frame member at a substantially same elevation as the sub frame member.

An automotive vehicle body is typically provided with a pair of rear side frames extending on either side of the vehicle body so that only one of the rear side frames is effective in absorbing the impact energy at the time of an offset rear end collision. According to the present invention, the efficiency of energy absorption can be improved because the impact energy of a rear end collision is absorbed not only by the rear side frames but also by the novel rear center frame which extends in the fore-and-aft direction along the bottom wall of the spare tire pan. In particular, at the time of a rear collision, the collapsing of the rear part of the vehicle body causes the rear center frame to become engaged with the sub frame member, such as a cross member, so that the sub frame is enabled to absorb the impact energy jointly with the rear center frame. Therefore, the impact energy can be absorbed even with a relatively small deformation stroke so that the safety of the vehicle is ensured and the fuel tank is protected at the time of a collision. Also, the freedom in the packaging of the vehicle that has a relatively short rear vehicle body can be improved, and the spare tire may be placed within the cabin.

If the rear center frame has a front part which has a lower rigidity than the sub frame member, as the rear center frame moves forward owing to the deformation of the rear floor panel, and comes into engagement with the sub frame member, the front part of the rear center frame collapses, and becomes engaged by the sub frame. Therefore, the rear center frame is prevented from slipping past (passing by) the sub frame member, and the impact energy is transmitted to the sub frame without fail.

By forming the sub frame member as having a channel cross section or a H-shaped cross section, the rear side of the sub frame member typically consisting of a cross beam supported by the side sills can be placed adjacent to the front part of the rear center frame so that the impact energy can be absorbed from an early phase of a collision.

If the front part of the rear center frame has a lower rigidity than a middle part of the rear center frame, when the rear center frame hits the sub frame, the front part of the rear center frame more readily deforms than the middle part of the rear center frame, and becomes engaged with the sub frame. Therefore, the impact load from the rear at the time of a rear end collision can be transmitted to the vehicle body in a stable manner from an early phase to a late phase of the rear end collision so that the impact energy can be absorbed in a stable manner.

If the rear part of the rear center frame has a lower rigidity than a middle part of the rear center frame and is more readily deformable than the middle part thereof, when the rear center frame hits the sub frame, the impact energy can be more efficiently absorbed from an early phase of a rear end collision, and such an uneven distribution of rigidity is effective in dampening the impact of the rear end collision.

If the rear center frame comprises a rear part which extends rearward from the middle part of the rear center frame in an upward inclination, and the rear part has a rear end attached to the spare tire pan via an end piece, when the impact load is applied to a part located higher than the rear part of the rear center frame, the impact energy is transmitted to the rear center frame via the end piece, and is absorbed by the collapsing of the rear part of the rear center frame along with the spare tire pan. Thereby, the rear center frame is enabled to transmit the impact energy to the front vehicle body structure without fail.

If the rear part of the rear center frame comprises a projecting portion which extends rearward from the spare tire pan, the impact load is applied to the projecting portion in an early phase of the collision, and the impact load is favorably distributed to the front part of the vehicle body via the rear wheel suspension system.

By further providing a reinforcement member that connects a middle part of the rear center frame to the rear side frames, the rear center frame is prevented from getting detached readily from the rear floor panel. Therefore, the rear center frame is prevented from laterally tilting when subjected to an impact load applied in the fore-and-aft direction so that the rear center frame is able to absorb the impact energy by collapsing without fail. The reinforcement member may also be attached to the bottom wall of the spare tire pan to further improve this effect.

By attaching the reinforcement member to the rear center frame so as to be readily detachable therefrom upon receiving an impact energy strong enough to collapse the middle part of the rear center frame, even when any one of the rear frames fails to collapse at the time of an offset rear end collision, the reinforcement member ensures the collapsing of the rear center frame without being hampered by the reinforcement member so that the rear center frame is allowed to absorb the impact energy by collapsing without fail.

If the rear part of the rear center frame comprises a towing member or a tie-down member, the towing member or the like can be attached to the rear center frame having a relatively high rigidity, and can be located in a laterally central part of the vehicle body.

By providing a pair of rear center frames located on either side of the vehicle body, the impact energy can be absorbed more efficiently and reliably. For instance, in the case of a 70% offset rear end collision, the three rear frames consisting of the two rear center frames and one of the rear side frames can adequately distribute the impact load. In the case of a 50% offset rear end collision, the two rear frames consisting of one of the rear center frames and one of the rear side frames can adequately distribute the impact load.

By further providing a reinforcement member that connects middle parts of the rear center frames to each other, the rear center frames are prevented from getting detached readily from the rear floor panel. Therefore, the rear center frames are prevented from laterally tilting when subjected to an impact load applied in the fore-and-aft direction so that the rear center frames are able to absorb the impact energy by collapsing without fail. The reinforcement members may also be attached to the bottom wall of the spare tire pan to further improve this effect.

By attaching the reinforcement member to each rear center frame so as to be readily detachable therefrom upon receiving an impact energy strong enough to collapse the middle part of the rear center frame, even when any one of the rear frames fails to collapse at the time of an offset rear end collision, the reinforcement member ensures the collapsing of at least one of the rear center frames without being hampered by the reinforcement member so that the rear center frame is allowed to absorb the impact energy by collapsing without fail.

If the reinforcement member comprises a jacking point stiffener piece, the jacking point stiffener piece can be placed in a concealed part on the bottom surface of the spare tire pan, and the external appearance can be improved.

According to a preferred embodiment of the present invention, the sub frame comprises a torsion beam rear wheel suspension system, and the sub frame member comprises a torsion beam of the rear wheel suspension system. Alternatively, the sub frame may comprise a sub frame for supporting a rigid axle or a rear wheel suspension system.

DETAILED DESCRIPTION OF THE PREFERRED EMBODIMENT(S)

Structure of the Embodiment

Now is described an embodiment of the present invention in which the vehicle body structure of the present invention is applied to a vehicle body of a hatchback passenger vehicle. FIG. 1 is a perspective view of the vehicle frame structure of the present invention. The vehicle body 1 of the illustrated embodiment comprises a floor frame assembly including a pair of side sills 2 and 3 laterally spaced from each other and extending in a fore-and-aft direction of the vehicle body, a first middle floor cross member 4 and second middle floor cross member 5 connecting middle parts and rear end portions of the two side sills 2 and 3 with each other, respectively, and a pair of rear side frames 6 and 7 extending from the rear ends of the corresponding side sills 2 and 3, respectively. The vehicle body 1 also comprises a floor panel assembly including a dashboard lower panel 8, a pair of front floor panels 9a and 9b forming the floor of the cabin, and a rear floor panel 11 defining a spare tire pan 10 and the floor of a trunk of the vehicle.

FIG. 2 is a perspective view of the rear frame structure of the vehicle embodying the present invention as seen from a bottom side thereof. As shown in FIG. 2, a pair of rear wheels W1 and Wr are rotatably supported by the vehicle body 1 via a H-type torsion beam rear wheel suspension system 12 which essentially consists of a pair of trailing arms 13 and 14 laterally spaced from each other and a torsion beam 15 having two ends rigidly connected to intermediate parts of the trailing arms 13 and 14. Each trailing arm 13, 14 has a front end 13a, 14a pivotally supported by a corresponding side sill extension 2a, 3a extending rearwardly and upwardly from the rear end of the corresponding side sill 2, 3 and a rear end 13b, 14b rotatably supporting the corresponding rear wheel W1, Wr. To a part of each trailing arm 13, 14 somewhat behind the point at which the torsion beam 15 is connected is attached a spring seat 13c, 14c to support a spring (not shown in the drawings) which transmits the load of the vehicle body 1 to the rear wheel suspension system 12.

To the lower surface a bottom wall 10a of the spare tire pan 10 formed by the rear floor panel 11 is attached a pair of rear center frames 21 and 22 by spot welding which are laterally spaced from each other and extend in the fore-and-aft direction of the vehicle body. Each rear center frame 21, 22 has a rectangular C-shaped cross section with an open side facing upward, and is additionally provided with lateral flanges on the upper end thereof for spot welding the rear center frame to the tire pan 10. Each rear center frame 21, 22 may also be provided with other shaped cross section including, not limitatively, any channel shaped cross section or closed cross section. An intermediate part of the left rear center frame 21 is connected to the left rear side frame 6 via a reinforcement member 23 at a left side face thereof, and to the right rear center frame 22 via a reinforcement member 25 at a right side face thereof. Likewise, an intermediate part of the right rear center frame 22 is connected to the left rear center frame 21 via the reinforcement member 25 at a left side face thereof, and to the right rear side frame 7 via a reinforcement member 24 at a right side face thereof.

The reinforcement members 23, 24 and 25 are each provided with a rectangular C-shaped cross section with an open side facing upward. Each reinforcement member 23, 24, 25 may also be provided with other shaped cross section including, not limitatively, any channel shaped cross section or closed cross section. The front and rear edges of the upper ends of each reinforcement member 23, 24, 25 are formed with flanges for attaching the reinforcement member to the spare tire pan 10, and flanges at lateral ends thereof for attaching the reinforcement member to the corresponding ones of the rear side frames 6 and 7 or the rear center frames 21 and 22. To the bottom surface of the centrally located reinforcement member 25 is attached a jacking stiffener piece 26.

To a lower surface of a rear end part of the left rear center frame 21 is attached to a towing ring 27 which can be used for towing another vehicle and tying down the vehicle itself. To the rear end of each rear center frame 21, 22 is attached an end piece 21c, 22c which extends upward and attached to a lower part of a rear wall 10b of the spare tire pan 10.

The rear center frames 21 and 22 are described in the following in greater detail with reference to FIGS. 3 to 5. FIG. 3 is a plan view of the rear vehicle body frame structure embodying the present invention, FIG. 4 is a sectional view taken along line IV-IV of FIG. 3, and FIG. 5 is an enlarged view of the part indicated by circle V in FIG. 3. In FIG. 3, the lower frame and associated parts are illustrated by seeing through the rear floor panel 11.

As shown in FIGS. 3 and 4, the rear center frames 21 and 22 each comprise a middle part 21a, 22a extending along the bottom wall 10a of the spare tire pan 10 in a substantially horizontal orientation, a rear part 21b, 22b extending from the rear end of the corresponding middle part in a rearward direction in an upward inclination, an end piece 21c, 22c connected to the rear end of the corresponding rear part 21b, 22b, and a front end member 21d, 22d internally fitted into the interior of the corresponding middle part 21a, 22a of the rectangular C-shaped cross section and projecting forward from the front end of the middle part 21a, 22a.

The rear part 21b, 22b of each rear center frame 21, 22 is given with a wrinkled or wavy configuration so as to demonstrate a lower rigidity than the middle part 21a, 22a thereof against the impact load of a rear end collision. The front end members 21d, 22d are fabricated by stamp forming steel sheet, and are given with a lower rigidity than the middle parts 21a, 22a of the rear center frames 21, 22 and torsion beam 15.

The rear end pieces 21c, 22c are each provided with a projecting portion 21e, 22e projecting rearward from the rear wall 10b of the spare tire pan 10, and are given with a lower rigidity than the middle parts 21a, 22a of the rear center frames 21, 22 and torsion beam 15, similarly to the front end members 21d, 22d. The reinforcement members 23, 24 and 25 are attached to the middle parts 21a and 22a of the rear center frames 21 and 22.

The rear floor panel 11 defines the spare tire pan 10 by bulging downwardly between the two rear side frames 6 and 7 to provide a space for accommodating a spare tire Ws. The two rear center frames 21 and 22 are located lower than the rear side frames 6 and 7 as they are attached to the lower surface of the lower wall 10a of the spare tire pan 10. The two rear center frames 21 and 22 and front end members 21d, 22d are located at a substantially same height as the torsion beam 15, and the rear center frames 21 and 22 extend substantially perpendicularly to the torsion beam 15.

The torsion beam 15 has a rectangular C-shaped cross section with an open side facing forward and the rear side being given with a pointed ridge line. The torsion beam 15 has a somewhat smaller vertical dimension than the front end members 21d and 22d. The front end members 21d and 22d are located adjacent to the rear end of the torsion beam 15. As the vehicle travels, the torsion beam 15 undergoes an arcuate vertical movement corresponding to the vertical displacement of the suspension system. Therefore, by forming the rear face of the torsion beam 15 as being arcuate or otherwise convex toward the rear as seen in a longitudinal vertical sectional view such as FIG. 4, the torsion beam 15 can be placed maximally closely to the rear center frames 21 and 22. Behind the rear center frames 21 and 22 is located a rear bumper face 28.

The torsion beam 15 may also be provided with other shaped cross section including, not limitatively, any channel shaped cross section or closed cross section. FIG. 4a shows such an example in which the torsion beam 15' is given with a H-shaped cross section including horizontal flanges and a vertical web. Instead of the torsion beam 15, 15' of a torsion beam rear wheel suspension system, a member such as a cross member of a sub frame may be placed in front of the rear center frames 21 and 22. Such a sub frame may be of any known configuration which is typically used for supporting a rigid axle or a rear wheel suspension system as long as it includes any member which is configured to engage the rear center frames 21 and 22 when the rear center frames 21 and 22 move forward at the time of a rear end collision.

The middle parts 21a and 22a of the rear center frames 21 and 22 are spot welded to the bottom wall 10a of the spare tire pan 10 so as to be readily broken off from the spare tire pan 10 when subjected to an impact load caused by a rear end collision strong enough to collapse the middle parts 21a and 22a. Similarly, the rear parts 21b and 22b of the rear center frames 21 and 22 are spot welded to the bottom wall 10a of the spare tire pan 10 so as to be readily broken off from the spare tire pan 10 when subjected to an impact load caused by a rear end collision strong enough to collapse the rear parts 21b and 22b. Further, the reinforcement members 23, 24 and 25 are spot welded to the rear frames 6, 7, 21 and 22 so as to be readily broken off from the rear frames 6, 7, 21 and 22 when subjected to an impact load caused by a rear end collision strong enough to collapse the middle parts 21a and 22a of the rear center frames 21 and 22. More specifically, as shown in FIG. 5, for instance, the reinforcement member 24 is attached to the rear side frame 7 by spot welding at welding points a, b, c and d. Although not shown in the drawings, the reinforcement member 24 is also attached to the rear center frame 22 by spot welding at four welding points.

Mode of Operation of the Embodiment

The mode of operation of the rear vehicle body structure at the time of a rear end collision is described in the following with reference to FIGS. 6 and 7. FIG. 7 shows the rear vehicle body structure which has deformed as a result of a rear end collision. A vehicle, which may be either stationary or traveling, could be hit by an oncoming vehicle from the rear end thereof (a rear end collision). If there were no rear center frames 21 and 22, an impact load caused by a full lap rear end collision would be transmitted to the rear side frames 6 and 7, and is then transmitted to the side sills 2 and 3 via the side sill extensions 2a and 3a, respectively. However, in case of an offset rear end collision, the impact load would act upon only one of the rear side frames 6 and 7 on the side corresponding to the offset rear end collision, and the impact would not be absorbed so much as desired because only one of the rear side frames 6 and 7 would be effective in absorbing the impact energy.

On the other hand, in the case of the vehicle body 1 of the illustrated embodiment, even when subjected to an offset rear end collision, the impact load acts upon the rear center frames 21 and 22 as well as one of the rear side frames 21 and 22 as indicated by bold arrows in FIG. 6. The impact load applied to the rear center frames 21 and 22 is absorbed by the collapsing of the projecting portions 21e, 22e of the rear end pieces 21c and 22c and the subsequent collapsing of the rear parts 21b and 22b in an initial phase of the collision. The rear center frames 21 and 22 move forward until the front end members 21d and 22d become engaged with the torsion beam 15 and, as a result, collapse in an intermediate phase of the collision. Finally, the collapsing of the middle parts 21a and 22a of the rear center frames 21 and 22 absorbs the impact energy, and the remaining impact energy is transmitted to the torsion beam 15 in a final phase of the collision.

The impact energy applied to the torsion beam 15 is transmitted to the side sills 2 and 3 via the front ends 13a and 14a of the corresponding trailing arms 13 and 14 and the corresponding side sill extensions 2a and 3a, respectively. Therefore, owing to the presence of the rear center frames 21 and 22, the vehicle body 1 is enabled not only to favorably absorb the impact energy but also to evenly distribute the impact energy. The vehicle body 1 of the illustrated embodiment demonstrates a favorable performance even in case of a full lap rear end collision as can be readily appreciated by a person skilled in the art.

In this conjunction, it should be noted that the rear parts 21b and 22b do not easily get detached from the spare tire pan 10 even when the impact load is applied to a part located higher that the rear center frames 21 and 22 because the rear parts 21b and 22b inclines upward toward the rear and are attached to the spare tire pan 10 via the end pieces 21c and 22c having flanges, respectively. Therefore, even in the case of a small lap rear end collision, the impact can be transmitted to the rear center frames 21 and 22 without fail, and the safety of the vehicle occupants can be improved. When the upwardly extending flanges of the end pieces 21c and 22c are further extended, the end pieces 21c and 22c may be more securely attached to the spare tire pan 10. As the rear parts 21b and 22b of the rear center frames 21 and 22 are provided with the projecting portions 21e and 22e that extend rearward from the spare tire pan 11, the impact load in an initial phase of a rear end collision is applied to the projecting portions 21e and 22e, and is distributed to the front part of the vehicle body 1 via the rear center frames 21 and 22 and rear wheel suspension system. Also, because the reinforcement members 23, 24 and 25 are attached to the both sides of the middle parts 21a and 22b of the rear center frames 21 and 22, and connect the adjoining rear frames to each other, the rear center frames 21 and 22 are prevented from laterally tilting at the time of a rear end collision, and the rear parts 21b and 22b are enabled to absorb the impact energy in a reliable manner.

When the rear center frames 21 and 22 move forward, the front end members 21d and 22d eventually collapse, and are pushed into the torsion beam 15. Therefore, the rear center frames 21 and 22 do not pass by the torsion beam 15. Therefore, the rear center frames 21 and 22 are supported by the torsion beam 15 against the impact load applied from the rear while the middle parts 21a and 22a are kept in the horizontal orientations thereof so as to be in a coaxial relationship to the impact load. In other words, the impact load is transmitted to the torsion beam 15 both efficiently and reliably.

Because the torsion beam 15 has a rectangular C-shaped cross section with an open side facing forward and a rear side having a pointed configuration, not only the torsion beam 15 is enabled to engage the front end members 21d and 22d relatively effectively but also the front end members 21d and 22d may be placed close to the torsion beam 15 that moves vertically so that the engagement can be effected in a reliable manner and the impact energy can be absorbed from an early phase of the collision. Furthermore, by selecting the rigidity of the rear parts 21b and 22b of the rear center frames 21 and 22 to be lower that that of the middle parts 21a and 21b of the rear center frames 21 and 22 so that the rear parts 21b and 22b may be made more readily deformable than the middle parts 21a and 21b, the impact energy can be absorbed from an early phase of a rear end collision.

The reinforcement members 23, 24 and 25 are attached to the middle parts 21a and 22a of the rear center frames 21 and 22 so as to be readily detached therefrom when subjected to an impact energy which is strong enough to collapse the middle parts 21a and 22a. Therefore, each rear frame 6, 7, 21, 22 is enabled to absorb impact energy independently from each other, and this also reduces the impact applied to the vehicle occupants.

The jacking point stiffener piece 26 is provided on the reinforcement member 25 so that the jacking point stiffener piece 26 is placed on the lower surface of the spare tire pan 11 which is concealed from view, and the external appearance can be improved. The towing ring 27 is provided on the rear part 21b of the rear center frame 21 that has a relatively high rigidity so that the vehicle can tow another vehicle at a point in a relatively laterally middle part of the vehicle body.

Owing to the structure described above, the spare tire Ws can be placed in the cabin, and the efficiency of absorbing energy can be improved. In particular, even though the deformation stroke is relatively small, the amount of the energy that can be absorbed can be increased more than was hitherto possible. Therefore, a higher level of freedom can be achieved in the packaging of the vehicle body, and the vehicle occupants and fuel tank can be protected against a rear end collision in a more reliable manner than was hitherto possible.

Modified Embodiment

A modified embodiment of the present invention is described in the following with reference to FIG. 8. In the description of the modified embodiment, the parts corresponding to those of the previous embodiment are denoted with like numerals without repeating the description of the structures and effects of such parts. FIG. 8 is a view similar to FIG. 4 showing the rear vehicle body structure of the modified embodiment. In the illustrated embodiment, a pair of rear center frames 31 and 32 are attached to the upper surface of a bottom wall 33a of a spare tire pan 33 defined by a rear floor panel 34. Therefore, the spare tire Ws is placed in the spare tire pan 33 so as to engage the upper surface of the rear center frames 31 and 32. The rear center frames are placed adjacent to the rear side of the torsion beam 15 at a substantially same elevation. Otherwise, this embodiment is similar to the previous embodiment.

This concludes the description of the illustrated embodiment, but the present invention is not limited by the illustrated embodiment, but may be modified in a variety of manners. For instance, although the illustrated embodiment was directed to a hatchback passenger vehicle, the invention is equally applicable to 2/4 door sedans, SUVs and so on. In the illustrated embodiment, a pair of rear center frames joined by three reinforcement members were used, but it is also possible to use a single center frame or three or more center frames that are joined by a corresponding number of reinforcement members. The engagement member made of a separate member was attached to the front end of each rear center frame, but may also be integrally formed in the front end of each rear center frame by changing the shape of the front end thereof so that the rigidity of this part may be decreased. In addition to such modifications, the cross sectional shapes of the engagement members and torsion beam, and the modes of joining various components may be varied without departing from the spirit of the present invention.

The contents of the original Japanese patent applications on which the Paris Convention priority claim is made for the present application as well as the contents of the prior art references mentioned in the present application are incorporated in this application by reference.

BRIEF DESCRIPTION OF THE DRAWINGS

Now the present invention is described in the following with reference to the appended drawings, in which.

Figure 1:
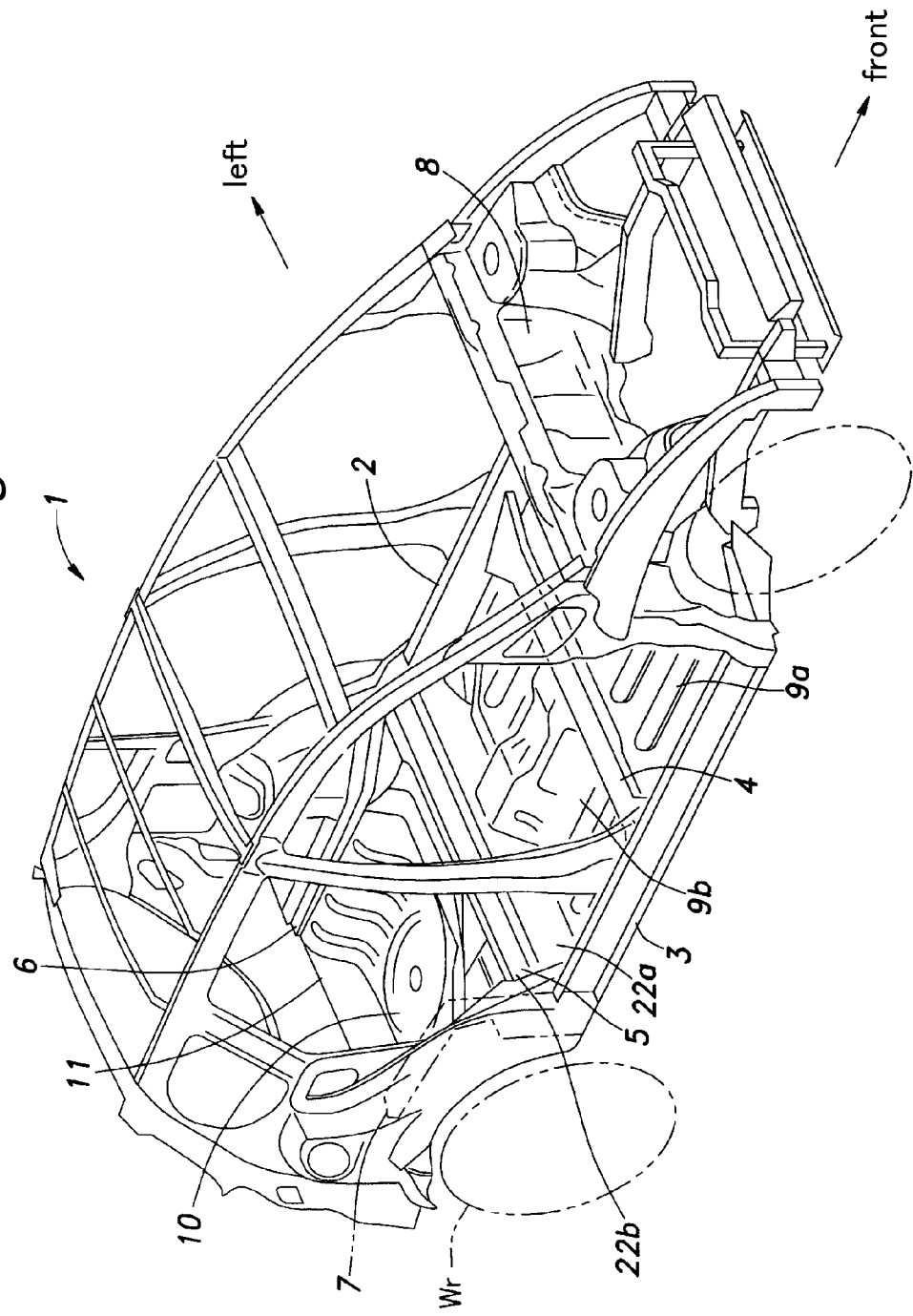
FIG. 1 is a perspective view of the vehicle body frame structure embodying the present invention.
Figure 2:
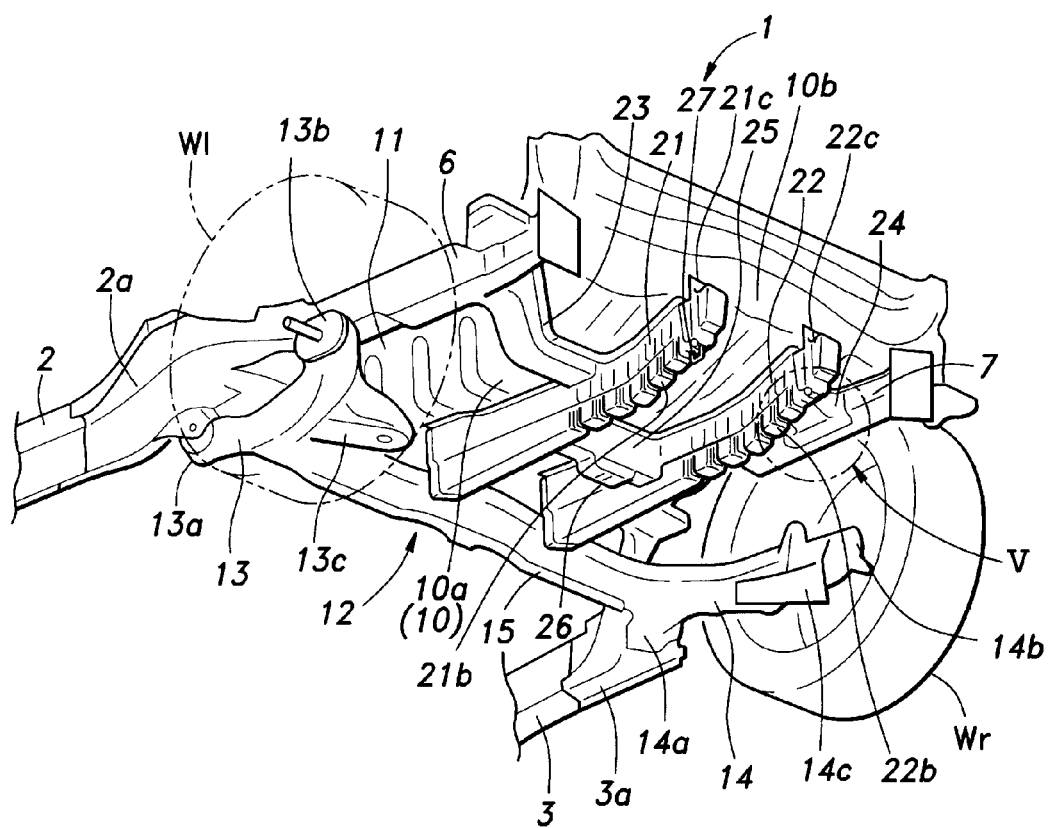
FIG. 2 is a bottom perspective view of the vehicle body rear frame structure embodying the present invention.
Figure 3:
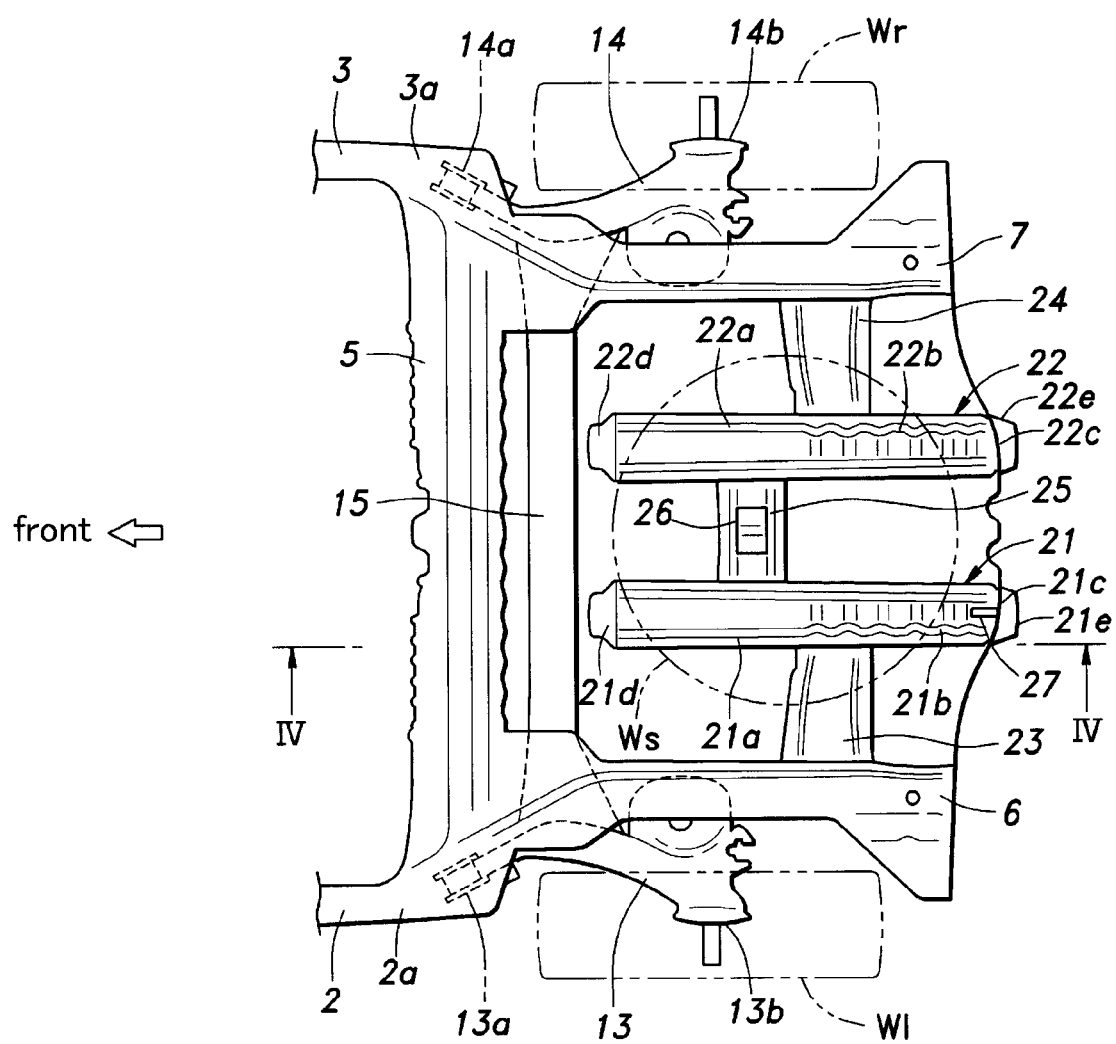
FIG. 3 is a plan view of the vehicle body rear frame structure embodying the present invention.
Figure 4:
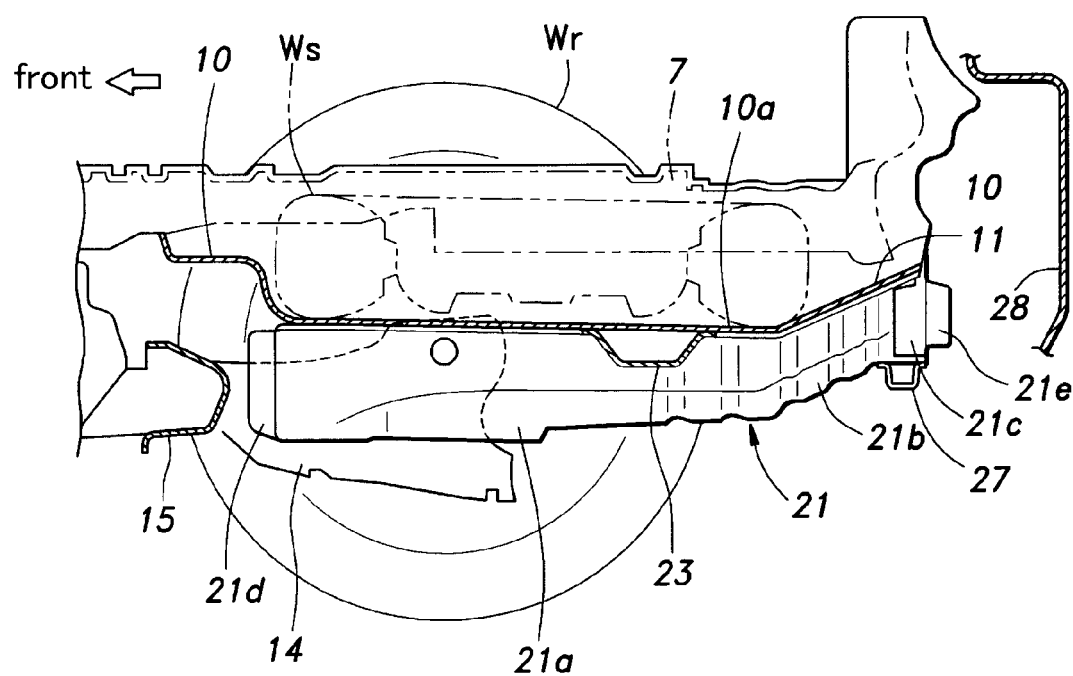
FIG. 4 is a sectional view taken along line IV-IV of FIG. 3.
Figure 4A:
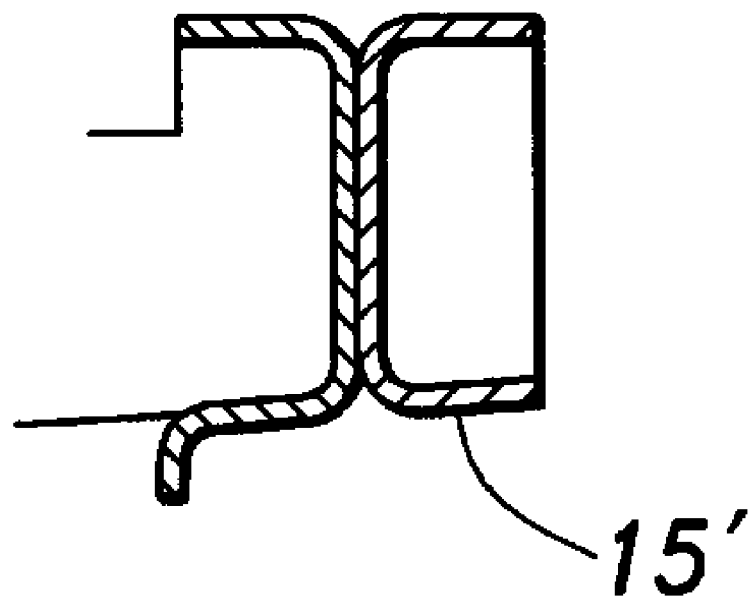
FIG. 4a is a fragmentary sectional view showing a modified embodiment of the torsion beam.
Figure 5:
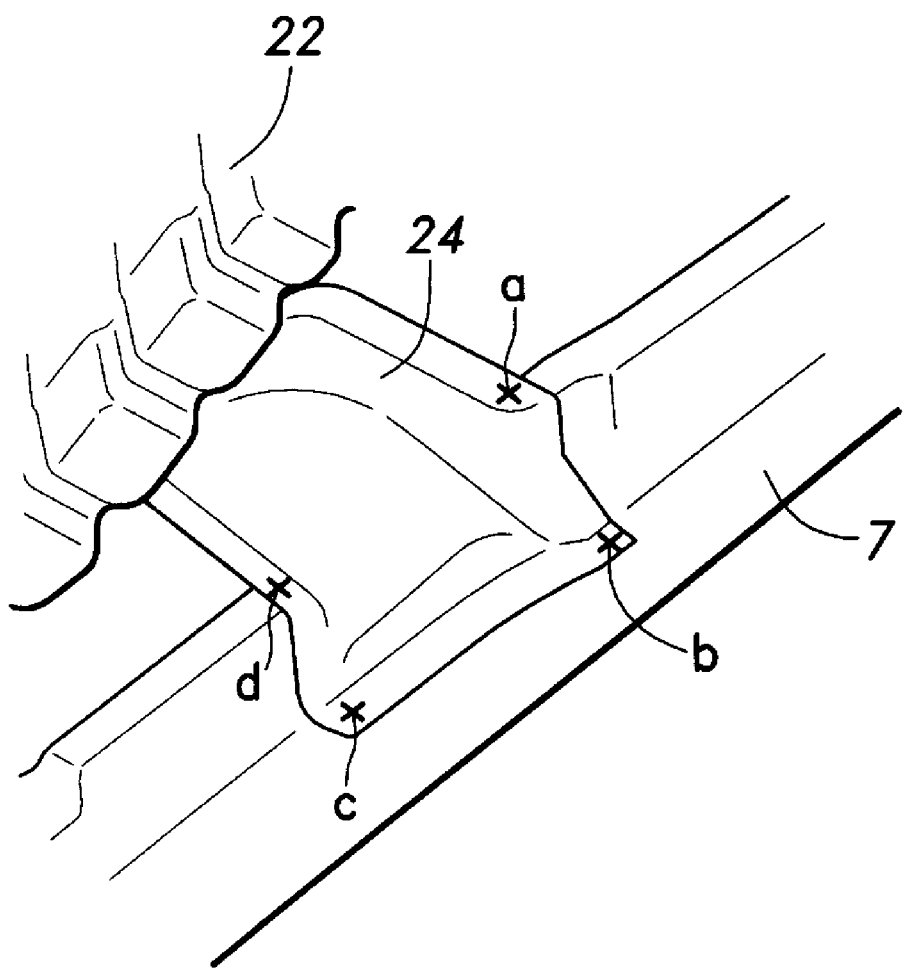
FIG. 5 is an enlarged view of a part indicated by V in FIG. 2.
Figure 6:
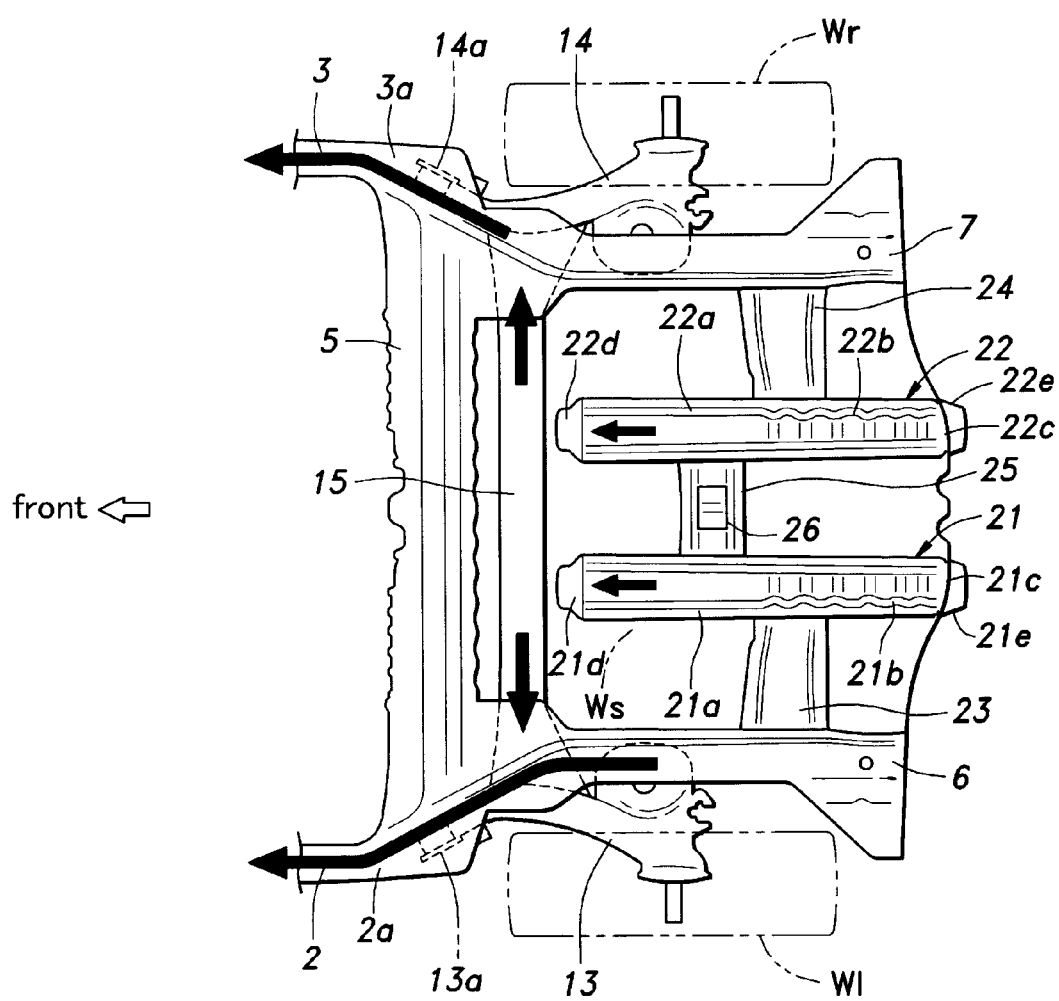
FIG. 6 is a diagram showing the mode of operation of the illustrated embodiment.
Figure 7:
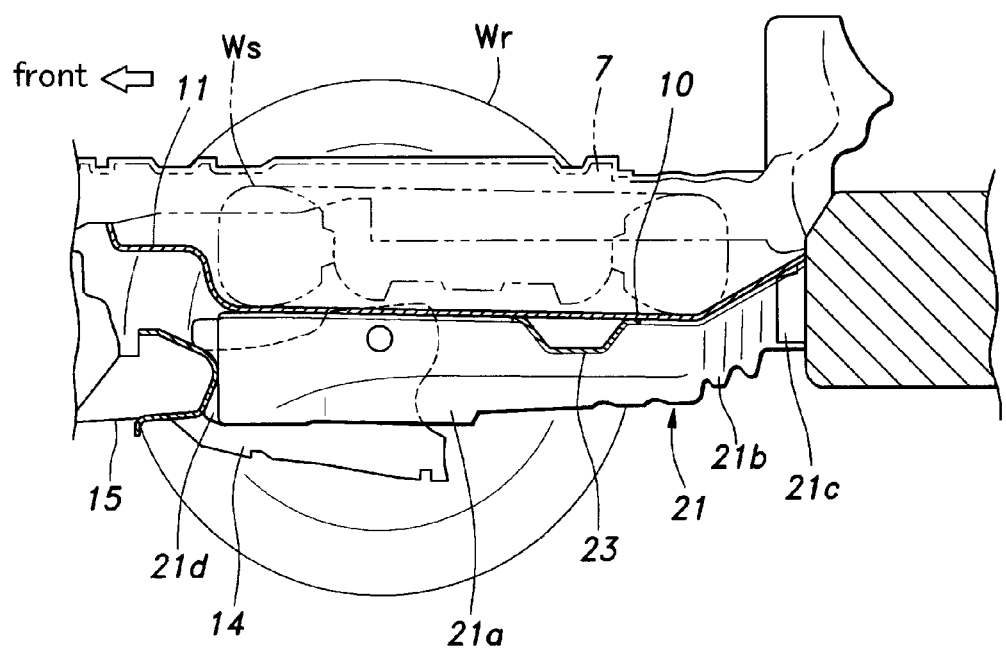
FIG. 7 is a sectional view showing the rear vehicle body structure of the illustrated embodiment which has deformed as a result of a rear end collision.
Figure 8:
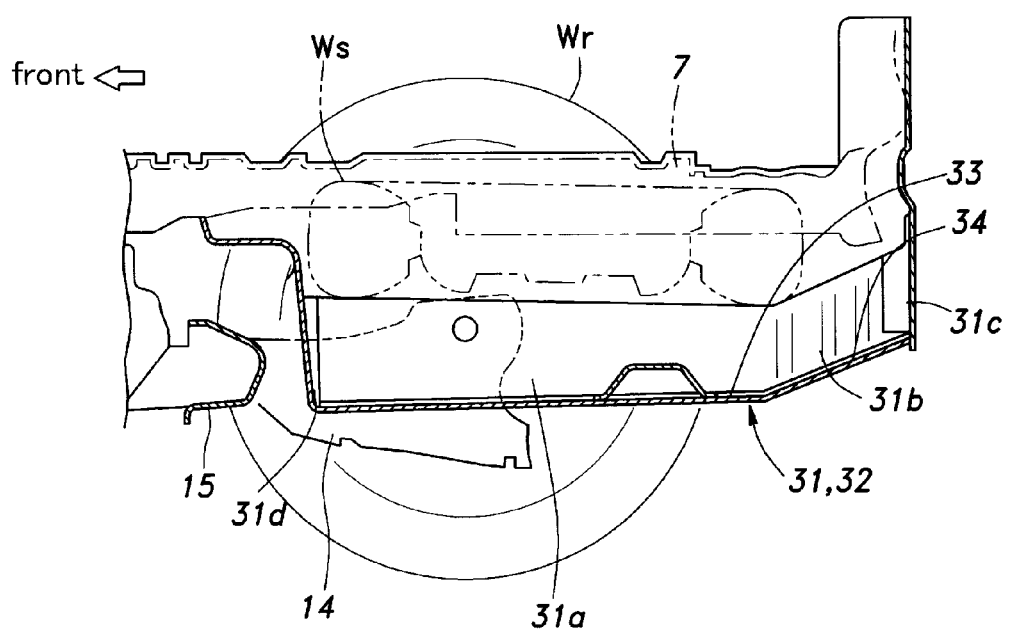
FIG. 8 is a sectional view of the rear vehicle body structure of the modified embodiment.

| GLOSSARY | |
|---|---|
| 1 | vehicle body |
| 2, 3 | side sill |
| 2a, 3a | side sill extension |
| 4 | first middle floor cross member |
| 5 | second middle floor cross member |

| GLOSSARY | |
|---|---|
| 9 | front floor panel |
| 9b | rear front floor panel |
| 10 | spare tire pan |
| 10a | bottom wall of the spare tire pan |
| 11 | rear floor panel |
| 12 | H-type torsion beam rear suspension system |
| 13, 14 | trailing arm |
| 15, 15' | torsion beam |
| 21, 22 | rear center frame |
| 21a, 22a | middle part |
| 21b, 22b | rear part |
| 21c, 22c | end piece |
| 21d, 22d | front end member |
| 21e, 22e | projecting portion |
| 23, 24, 25 | reinforcement member |
| 26 | jack-up stiffener |
| 27 | tow ring |
| Ws | spare tire |
| a, b, c, d | welding points |
| 31, 32 | rear center frame |
| 33 | spare tire pan |
| 33a | bottom wall of the spare tire pan |

The invention claimed is:

1. An automotive rear vehicle body structure having a sub frame supporting a pair of rear wheels disposed behind a pair of side sills on either side of a vehicle body, comprising:
   a pair of rear side frames extending rearwardly from the side sills on either side of the vehicle body;
   a rear floor panel extending between the rear side frames and bulging downward so as to define a spare tire pan; and
   at least one rear center frame extending in a fore-and-aft direction along a lower wall of the spare tire pan;
   the rear center frame being disposed behind a sub frame member at a substantially same elevation as the sub frame member, said rear center frame comprising a front part that has a lower rigidity than the sub frame member.

2. The automotive rear vehicle body structure according to claim 1, wherein the sub frame member comprises a cross member.

3. The automotive rear vehicle body structure according to claim 1, wherein the sub frame member is provided with a channel cross section or a H-shaped cross section.

4. The automotive rear vehicle body structure according to claim 1, wherein the rear center frame front part has a lower rigidity than a middle part of the rear center frame.

5. The automotive rear vehicle body structure according to claim 1, wherein the rear center frame comprises a rear part that has a lower rigidity than a middle part of the rear center frame.

6. The automotive rear vehicle body structure according to claim 1, wherein the rear center frame comprises a rear part that extends rearward from a middle part of the rear center frame in an upward inclination, and the rear part has a rear end attached to the spare tire pan via an end piece.

7. The automotive rear vehicle body structure according to claim 6, wherein the rear part of the rear center frame comprises a projecting portion that extends rearward from the spare tire pan.

8. The automotive rear vehicle body structure according to claim 1, further comprising a towing member or a tie-down member attached to a rear part of the rear center frame.

9. The automotive rear vehicle body structure according to claim 1, wherein said at least one rear center frame is a pair of rear center frames, and the pair of rear center frames are laterally spaced from each other and extend in a fore-and-aft direction along a lower wall of the spare tire pan, each the rear center frame being disposed behind the sub frame member at a substantially same elevation as the sub frame member.

10. The automotive rear vehicle body structure according to claim 9, further comprising a reinforcement member that connects middle parts of the rear center frames to each other.

11. The automotive rear vehicle body structure according to claim 10, wherein the reinforcement member is attached to the lower wall of the spare tire pan.

12. The automotive rear vehicle body structure according to claim 10, wherein the reinforcement member is attached to each rear center frame so as to be readily detachable therefrom upon receiving an impact energy strong enough to collapse a middle part of the rear center frame.

13. The automotive rear vehicle body structure according to claim 11, wherein the reinforcement member comprises a jacking point stiffener piece attached to a lower surface thereof.

14. The automotive rear vehicle body structure according to claim 1, wherein the sub frame comprises a sub frame for supporting a rigid axle or a rear wheel suspension system.

15. An automotive rear vehicle body structure having a sub frame supporting a pair of rear wheels disposed behind a pair of side sills on either side of a vehicle body, comprising:
- a pair of rear side frames extending rearwardly from the side sills on either side of the vehicle body;
- a rear floor panel extending between the rear side frames and bulging downward so as to define a spare tire pan;
- at least one rear center frame extending in a fore-and-aft direction along a lower wall of the spare tire pan;
- the rear center frame being disposed behind a sub frame member at a substantially same elevation as the sub frame member; and,
- a reinforcement member that connects a middle part of the rear center frame to the rear side frames.

16. The automotive rear vehicle body structure according to claim 15, wherein the reinforcement member is attached to the lower wall of the spare tire pan.

17. The automotive rear vehicle body structure according to claim 15, wherein the reinforcement member is attached to the rear center frame so as to be readily detachable therefrom upon receiving an impact energy strong enough to collapse a middle part of the rear center frame.

18. An automotive rear vehicle body structure having a sub frame supporting a pair of rear wheels disposed behind a pair of side sills on either side of a vehicle body, comprising:
- a pair of rear side frames extending rearwardly from the side sills on either side of the vehicle body;
- a rear floor panel extending between the rear side frames and bulging downward so as to define a spare tire pan; and
- at least one rear center frame extending in a fore-and-aft direction along a lower wall of the spare tire pan;
- wherein the rear center frame is disposed behind a sub frame member at a substantially same elevation as the sub frame member, and wherein the sub frame comprises a torsion beam rear wheel suspension system, and the sub frame member comprises a torsion beam of the rear wheel suspension system.

* * * * *